US008850272B2

(12) United States Patent
Pasala et al.

(10) Patent No.: US 8,850,272 B2
(45) Date of Patent: Sep. 30, 2014

(54) METHOD AND SYSTEM TO MEASURE PREVENTABILITY OF FAILURES OF AN APPLICATION

(75) Inventors: Anjaneyulu Pasala, Karnataka (IN); Srinivas Padmanabhuni, Karnataka (IN); Sadhana Chevireddy, Andhra Pradesh (IN); Gerardo Carrera Mendoza, London (GB)

(73) Assignee: Infosys Limited, Bangalore, Karnataka (IN)

( * ) Notice: Subject to any disclaimer, the term of this patent is extended or adjusted under 35 U.S.C. 154(b) by 460 days.

(21) Appl. No.: 13/241,800

(22) Filed: Sep. 23, 2011

(65) Prior Publication Data

US 2012/0311389 A1    Dec. 6, 2012

(30) Foreign Application Priority Data

May 30, 2011    (IN) .......................... 1817/CHE/2011

(51) Int. Cl.
*G06F 11/00*    (2006.01)
(52) U.S. Cl.
CPC .................................. *G06F 11/008* (2013.01)
USPC .................. 714/47.1; 714/38.1; 714/47.3

(58) Field of Classification Search
USPC ...................... 714/38.1, 41.1, 47.3
See application file for complete search history.

(56) References Cited

U.S. PATENT DOCUMENTS

| 5,548,718 | A  | * | 8/1996 | Siegel et al. ................. 714/38.1 |
| 7,747,987 | B1 | * | 6/2010 | Akarte et al. ................. 717/131 |
| 7,870,439 | B2 | * | 1/2011 | Fujiyama et al. ............. 714/47.1 |
| 8,195,983 | B2 | * | 6/2012 | Celeskey et al. ............. 714/38.1 |
| 2007/0079243 | A1 | * | 4/2007 | Leigh et al. .................... 715/736 |

* cited by examiner

*Primary Examiner* — Joshua P Lottich
(74) *Attorney, Agent, or Firm* — Michael Best & Friedrich LLP

(57) ABSTRACT

Embodiments of the disclosure relate to a method and system for measuring preventability metric of an application. The preventability metric quantifies the extent to which bugs and failures, and the causes for failures are diagnosed in the application. Also, the extent to which appropriate preventive or corrective activities are deployed before deployment of the application is provided. Further, a framework to monitor and control the preventability metric systematically is disclosed. The methodology is to obtain the efficiency of the preventive techniques used on the application, use the obtained efficiency measures to arrive at a preventability metric that quantifies the preventability of failures of the application.

24 Claims, 4 Drawing Sheets

METHOD AND SYSTEM TO MEASURE PREVENTABILITY OF FAILURES OF AN APPLICATION

TECHNICAL FIELD

Embodiments of the present disclosure relate to measure the preventability of failures. More particularly, the embodiments relate to a method and a system to measure the preventability of failures in an application.

BACKGROUND

Presently, a study published by the National Institute of Standards and Technology (NIST) showed that application or software defects cost 60 billion USD annually to US economy. Another study says that the annual cost of IT failure is around 6.18 trillion USD with failure rate increasing at a rate of around 15% per year. In yet another study, it is found that 47% had higher maintenance costs than expected. These statistics show that a lot of cost is being spent in maintaining the application or software.

Application or software maintenance is a process of modifying an application or software system or component after delivery to correct faults, improve performance or other attributes, or adapt to a changed environment. The definition is conceptualized as a reactive activity which is carried after software delivery to the users. Accordingly, software maintenance activity aims to fix, enhance and change the application or software after releasing and also looks to optimize these tasks by having a complete maintenance plan before delivery.

Application maintenance can be of two types, reactive and preventive. In the reactive maintenance, bugs are corrected after they were reported by the end-users or customers of software. Whereas, in the preventive maintenance steps are taken to correct bugs that are under the hood of the application before they are manifested during the usage of the application by the end-users.

The reactive maintenance can be classified as corrective maintenance, adaptive maintenance and perfective maintenance as they are triggered or applied on receiving the end-user request and observing the degradation in the performance of the application.

Corrective maintenance which deals with fixing faults in the system that could have been originated by its users from different sources such as design, logic or coding errors. Generally, a user requests to fix the fault found in application or software triggers a corrective measure.

Adaptive maintenance consists of making the application to work for particular changes in the environment. For example, changes in hardware architecture, new government policies or different business rules. This can be done by constantly monitoring the application or software environment.

Perfective maintenance modifies the software according to user requests for an enhanced functionality.

Preventive maintenance aims to prevent faults or failures before they become evident while using the application or software after its release and deployment. Preventive maintenance (PM) is carried out by analyzing and using well-conceived techniques and processes to find unidentified errors during the normal verification and validation process of the application. The PM activity is an anticipatory activity as it aims to prevent errors before they occur. There is a need to identify techniques that identify/recognize and rectify faults before the application or software is being released. Preventive maintenance techniques are expected to bring down the cost of maintenance of application or software.

The current techniques have the following limitations, there are no metrics defined for preventability of failures of application or software. There are no techniques to measure or predict the preventability of application. There are no techniques or methods that quantify the quality of an application from the point of how effectively it is designed to prevent the failures from occurring in the field. The existing methods do not propose a metric which defines the overall quality of the application to estimate how well it can prevent failures in future. The existing metrics and techniques used during maintenance are reactive in nature rather than being preventive.

SUMMARY

The shortcomings of the prior art are overcome and additional advantages are provided through the provision of a method and system as described in the description.

The present disclosure solves the limitations of existing techniques by providing a method and a system for measuring preventability of failures of an application.

In one embodiment, the disclosure provides a method of measuring preventability of failures of an application. The method includes sending a request by a client to the application server for identifying at least one predefined metric that captures the efficiency of the preventive techniques used on the application. Further, assigning a weighing coefficient to the identified metric based on its influence on the overall preventability it brings in the system, by the application server upon receiving the client's request. The method further includes, measuring value of the identified metric and multiplies the measured value with the corresponding weighing coefficient to produce a weighted metric. Each weighted metric is then combined by the client to produce a preventability metric corresponding to the preventability of the failures in the application. The measured preventability of the failures in the application is transmitted to the client from the application server.

In one embodiment, the disclosure provides a system to measure the preventability of failures of an application. The system includes an application server responsive to identify at least one predefined metric that captures the efficiency of the preventive technique used for the application and to assign a weighing coefficient to the identified metric. Also, the application server measures each metric value, multiplies the measured metric values with the corresponding weighing coefficient to produce a weighted metric. Further, combining the weighted metric to produce a preventability metric corresponding to preventability of failures of the application. The system also includes a computing device comprising a processor responsive to receive the preventability metric. Also, the computing device consists of a framework to monitor and control the preventability metric. A display unit is connected to the computing device to display value of the preventability of failures value of the application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The embodiments of the disclosure itself, however, as well as a preferred mode of use, further objectives and advantages thereof, will best be understood by reference to the following detailed description of an illustrative embodiment when read in conjunction with the accompanying drawings. One or more embodiments are now described, by way of example only, with reference to the accompanying drawings in which:

DETAILED DESCRIPTION

Figure 1A:
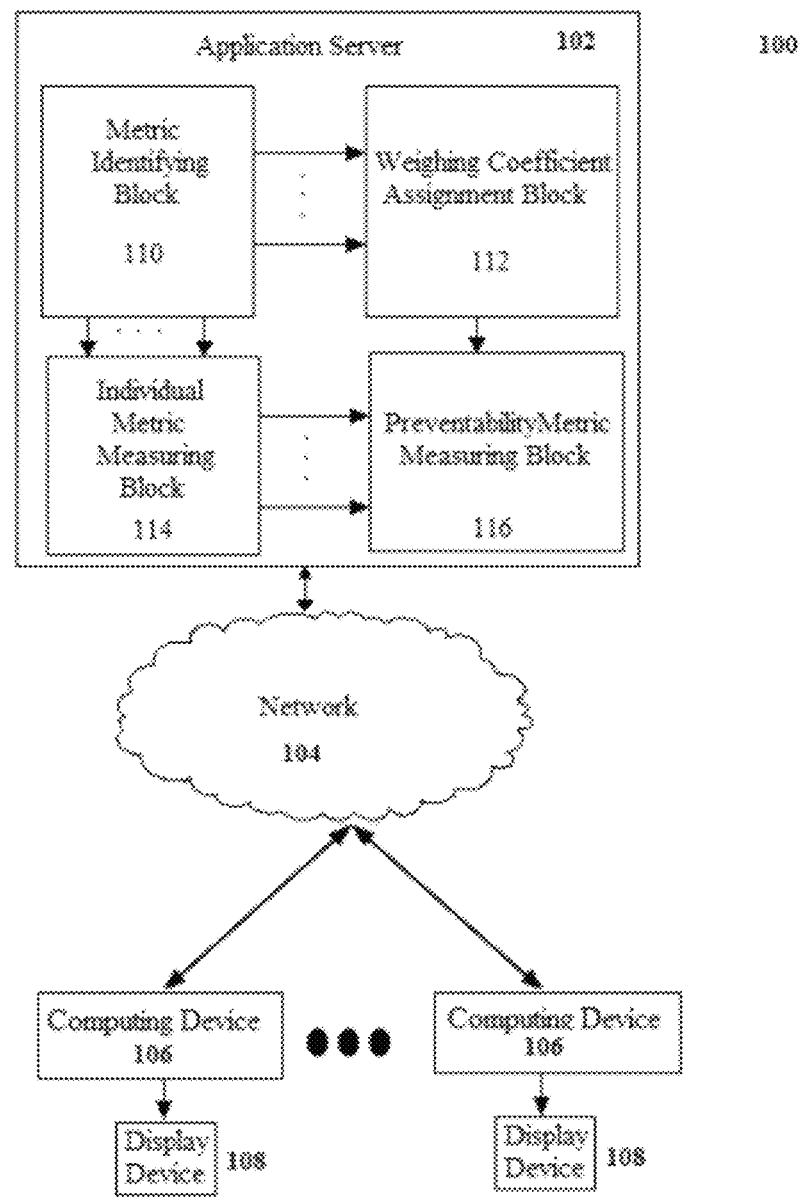
FIG. 1A illustrates an exemplary system block diagram to measure the preventability metric of an application.

The drawings for the sake of uniformity depict embodiments of the disclosure for purposes of illustration only. One skilled in the art will readily recognize from the following description that alternative embodiments of the structures and methods illustrated herein may be employed without departing from the principles of the disclosure described herein.

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present disclosure provide a method and a system to measure preventability of failures in an application and estimate the quality of the application with respect to precautions taken to reduce the failures that might occur in the field. Also, the disclosure provides a unique framework to systematically monitor and control the preventability of failures of an application and updating metrics used in the preventability measure.

In one embodiment, the disclosure provides a metric that can be used to assess the preventability of the bugs or failures in an application or software, so that the methodology can be used or applied to reduce the effect of failures or bugs before they surface in the field.

Presently, maintenance activity is directed towards correcting the failures after they are found in the application. However, all the errors are not identified during system testing and the only possible way is to wait for the end-users to report the errors. The present disclosure provides a method to quantify the readiness of the application to be deployed in the field, so that it will cause fewer failures in the field in future and thereby reducing the post deployment maintenance activity.

The improvement in the quality is again reflected by the metrics disclosed. An analysis is carried until the application meets a minimum quality requirement defined at the organization level. For example, minimum threshold of preventability measure should be met before it qualifies to be deployed. Also, a framework where each aspect of the application is evaluated to periodically monitor, control and update the preventability metric.

Figure 1B:
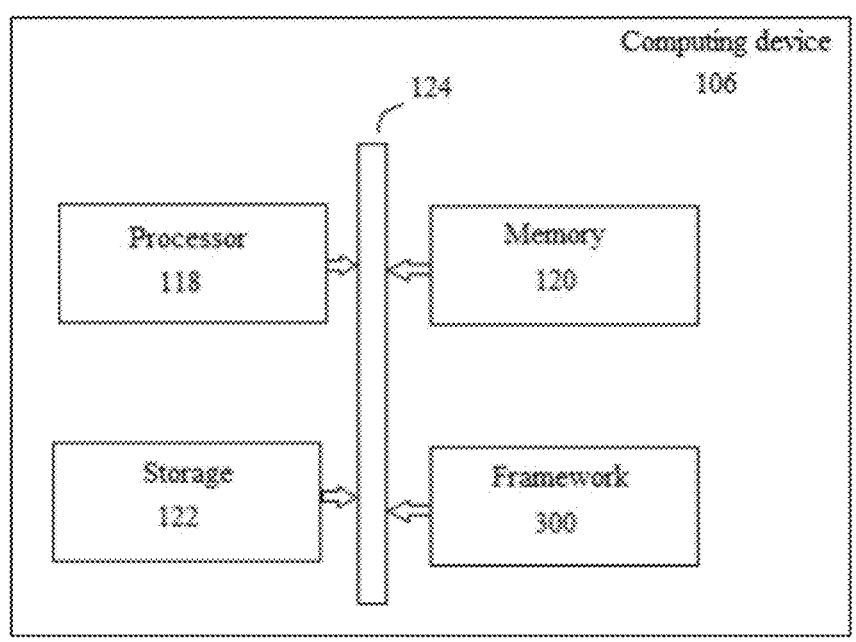
FIG. 1B illustrates the block diagram of a computing device.

In one embodiment, the FIG. 1 shows a block diagram of the system 100 for preventability of failures of an application. The system includes an application server 102 responsive to identify at least one predefined metric of an application and to assign a weighing coefficient to the identified metric. The application server 102 consists of a metric identifying block 110 to identify the predefined metrics of the application. Also, the application server 102 consists of an individual metric measuring block 114 to measure values of the identified metrics, weighing coefficient block 112 to multiply the measured metric values with the corresponding weighing coefficient to produce a weighted metric. Further, the weighted metrics are combined using preventability metric assignment block 116 to produce a preventability metric corresponding to preventability of failures of the application. The system also includes at least one computing device 106 comprising a processor responsive to receive the preventability metric from the application server through a network 104. The computing device 106 comprises a processor 118, memory 120 and storage device 122 for storing the received information from the application server 102; a framework 300 to systematically monitor and control the application or software for any changes and accordingly update the preventability metric; and a system bus 124 interconnecting the components in the computing device. Further, the system consists of a display unit 108 connected to the computing device to display the preventability of failures value of the application.

The disclosure provides a methodology to define the measure of preventability of an application or software by identifying the preventive techniques used in the application or software that contributes to the preventability of failures/bugs. Preventability is an indicator to application or software quality on how much care has been taken to prevent failures. Also, a framework to systematically monitor and control the application or software for any changes and accordingly update the preventability metric.

In one embodiment, the measure of preventability for an application or software is performed based on measuring the efficiency of preventive techniques employed to prevent failures/bugs in software including but are not limited to bug prediction, regression testing, architecture conformance, software rejuvenation, knowledge engineering etc. These aspects determine the post deployment maintenance activity of the application or software. By utilizing the preventive techniques, the number of failures that might occur in future i.e. after the deployment of the application can be reduced. For example, there is a modularity metric defined to know how independent one module is from other modules of an application. The metric gives a quantitative measure to determine how well the application is designed. Similarly, if by identifying other metrics of the application, which directly or indirectly contribute to the preventability of failures, it would help in deciding whether the application is ready for deployment. Also, such pre-evaluation of application in terms of how resilient it is to the failures helps in reducing the post maintenance activity in terms of time, effort and cost.

Hence, a metric to measure how effectively an application is designed to prevent failures is captured by measuring preventability metric is disclosed. In computing the preventability metric, the preventive techniques of the application which are considered are bug prediction; regression testing and impact analysis; application or software rejuvenation; architecture conformance and knowledge engineering techniques.

Bug prediction is one of the preventive techniques as it predicts the number of bugs in a source code. This helps in maintenance to reduce costs and make the application robust before and after delivery. Automatic bug predictions techniques are used to use resources efficiently. These prediction techniques are used to avoid potential post-release failures. The measuring of the efficiency of the bug prediction techniques till the latest release can serve as, one of the measures which contribute to the preventability metric. As an example, for computing preventability metric for an application which is due for its n+1 release, the bug prediction metric can be calculated by considering the version history of n−1 releases and their bugs history and therefore predicting the bugs for $n^{th}$ release. Also, the same bug prediction techniques is used to predict buggy components in $n+1^{th}$ release and appropriately allocate resources to thoroughly test the predicted buggy components. Upon finding the bugs, the correction mechanism is employed before the application is deployed.

In one embodiment, the bug prediction metric is calculated as follows:

The bug prediction results on $n^{th}$ release of the application to evaluate the preventability measure for the application that is due for its $n+1^{th}$ release. Let $B_e$ be the measure of predictive power of the bug prediction technique used. $B_e$ can be used for calculating the preventability measure. For, first two releases of the application, $B_e$ is calculated as $$B_e = \frac{N_{tb}}{N_{pb}},$$

where $N_{tb}$ is the number of bugs found during the testing phase of the application before its release and $N_{pb}$ be the number of predicted bugs. For higher releases, first learning models are built from version and bug histories of n−1 releases. Let $N_{ab}$ be the actual bugs found in $n^{th}$ release of the application. Now, $B_e$ is calculated as $$B_e = \frac{N_{pb}}{N_{ab}}$$

From the definition, $B_e$ value close to '1' is desirable as the bug prediction is capable of predicting all the bugs reported. An application system that is being tested with such a prediction system is bound to have less bugs in future. Hence, the preventability of software can be captured by measuring the efficiency of the bug prediction mechanism used.

Regression Testing is another metric used to measure preventability of failure of an application. Application maintenance typically involves changes in the code of the application. Upon incorporating the change, the application is re-validated using regression testing techniques. Regression testing involves selective re-testing of the application or component to verify that changes made to it have not caused any unintended affects and that the application still complies with its specified requirements. This testing provides to assess the impact of the change being made and select test cases that exercise essentially the impacted parts of the application and might reveal faults in it. Efficiency of these techniques is measured based on their ability to reveal the bugs hidden in the application so that bugs will not surface after deployment.

If the technique reveals more bugs during the testing phase itself then less number of bugs to be caught after deployment. Further analysis on history of bugs and versions of code has been carried to identify the bugs inherent in the application. Therefore, the efficiency of regression analysis and testing techniques will enhance the preventability of failures in an application or software. Hence, improve the measure of the preventive maintenance.

Further, the intent of regression testing is to assure that a change, such as a bug fix, did not introduce new bugs. The efficiency of regression testing is evaluated on the application to be released by identifying the number of bugs reported in the current version and cross check the bugs were present in the previous version of the application. If the bugs of the current version are new and are introduced due to changes like bug fixing activities, then the regression testing technique performed has to be cross checked. Further, if the bugs in the current version are not due to the changes performed on the application, then the efficiency of the system is high. The efficiency is computed by considering the parameters $b_n$ be the number of bugs found for the current version n that is due to changes in version n−1 and $a_{n-1}$ be the number of bug fixing activities of version n−1. The regression testing efficiency is $$R_e = 1 - \frac{b_n}{a_{n-1}}$$

If the value of $b_n$ is '0' then the regression testing efficiency is high.

Application or software rejuvenation is another aspect regarding preventability of application or software. Application ageing measures the degradation of application or its environments over a period of time. It is usually related with transient failures. The primary causes for transient failures are data corruption, numerical error accumulation, storage space fragmentation. To overcome failures due to application or software aging, anti-aging techniques are usually applied which gracefully terminates an application and immediately restarts it at a clean internal state. If the quality improvement due to applying of anti-aging techniques is measured, it serves as an indication of how well the aging effects are handled before releasing a new version of the application. Therefore, software anti-aging techniques like rejuvenation contributes to the prevention of failures in software and a factor that influence the preventability metric. The efficiency of the software rejuvenation techniques is obtained by measuring $F_{red}$.

$$F_{red} = \frac{(F_i - F_f)}{F_i}$$

where $F_i$ is the initial failures in the application that are due to ageing and $F_f$ is the number of failures after the rejuvenation techniques are used. If $F_{red}$ is '1', then all the failures that occur due to application ageing process are taken care of by the rejuvenation technique. Thus, this metric provides assessment of the preventability of the application.

Architecture conformance is another factor that effects the software failures and hence the preventability. Constant use of an application on deployment and continued maintenance over a period of time introduces changes in architecture or hardware features which causes deviation from intended architecture and metrics thereof, causing further application failures. Modularization is used to partition the application into easily maintainable and extendable modules on the basis of cohesiveness of the service provided by each module. In addition to keeping track of modularity, the application has to be evaluated for the conformance of GUI (graphical user interface), parallelism and concurrency of various versions of the application. The evaluation is required as the systems undergo architectural degradation as a result of its implementation and continuous evolution. The architecture conformance depends upon the features like modularity, GUI conformance, concurrency and parallelism and combination thereof. By using the existing techniques, all the features are evaluated separately. As an example, let the evaluated or measured values be $a_1, a_2, \ldots, a_n$ where 'n' is the number of architecture parameters. The metrics are measured by evaluating the features and are combined to obtain the architecture conformance metric value. The architecture conformance metric value is represented as $$A = c_1 a_1 + c_2 a_2 + \ldots + c_n a_n, \text{ where } c_i \text{ is the weight associated with parameter } a_i$$

The weights are assigned based on the contribution of each parameter to the architecture of the code.

Use of knowledge engineering techniques is another factor that influences the preventability of failures of an application. Systems which are already developed few years ago use obsolete techniques and tools, and do not document knowledge properly. Knowledge related to application domain, programming skills, engineering techniques, etc is required for further assistance in the maintenance process of an application. By using knowledge engineering techniques, an application can be evaluated through subjective tests. To arrive at the knowledge engineering metric the following function has to be performed i.e. documentation, comments, incident reports and other forms of knowledge related to the application system and representing Knowledge using ontologies, probabilistic models etc. Further, evaluating the usefulness of knowledge engineering on the scale of 1-5, by subjective tests and normalizing the score to 0-1.

The preventability metric is a measure of the quality of an application in terms of how well prevention of bugs or failures is handled. The preventability metric is influenced by the factors which are discussed above and the number of these factors is not limited to five, which can be more or less in number. The contribution of these techniques to the metric varies according to the application. Hence, the final preventability metric is a sum of weighted metrics of each of these factors which is shown in FIG. 2.

Figure 2:
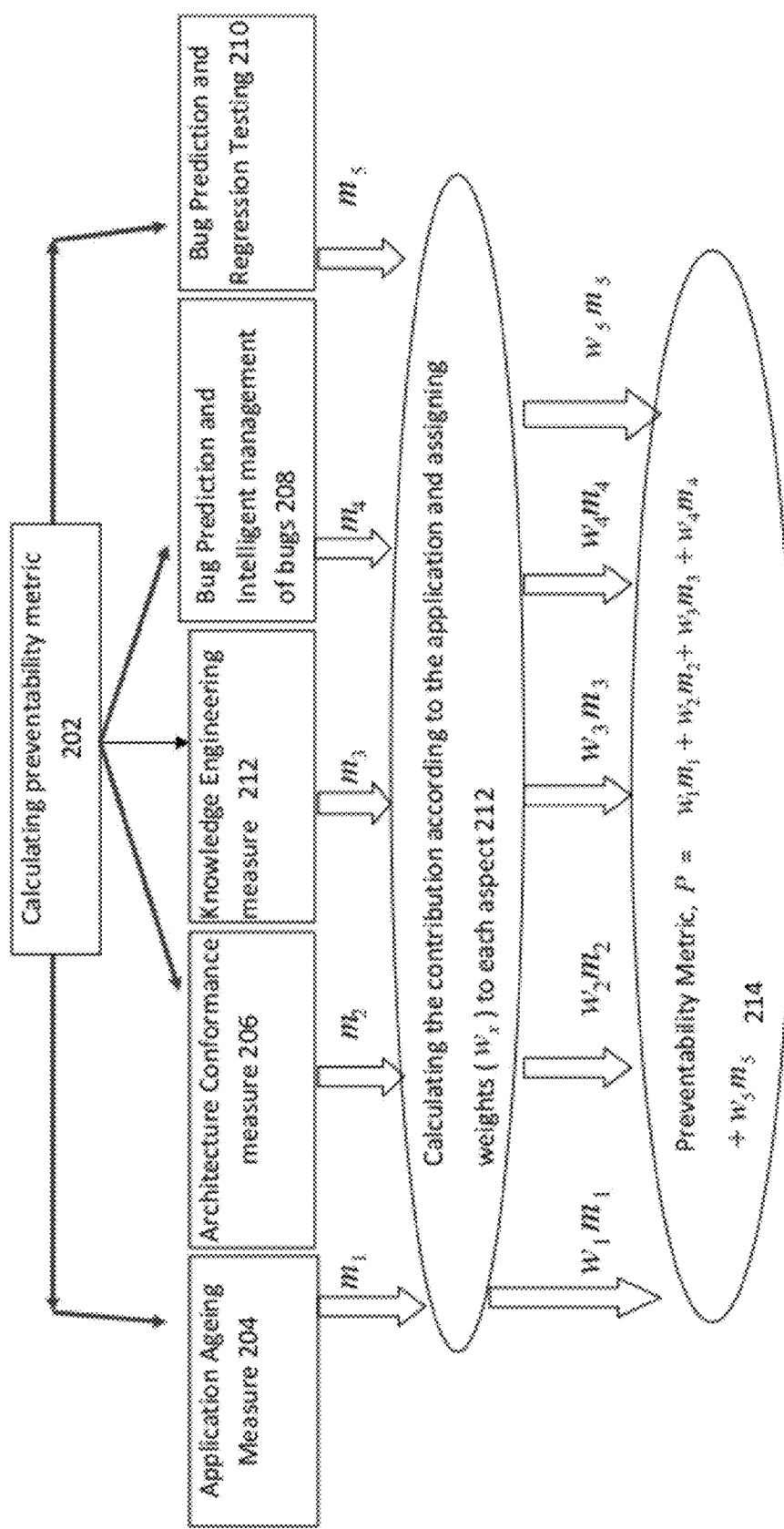
FIG. 2 illustrates a flowchart to measure the preventability metric of an application, in accordance with one embodiment.

As shown in the FIG. 2, $m_n$ is the individual metric from each aspect i.e. application rejuvenation 204; architecture conformance 206; GUI, concurrency and parallelism 208; and bug prediction and regression testing 210 of an application. The metric $m_n$ is then multiplied with corresponding weight $w_n$ i.e. $w_1 m_1$, $w_2 m_2$, $w_3 m_3$, $w_4 m_4$ etc depending on how much it contributes to the overall quality of the application or software. The weighted metrics are finally combined together to get the final preventability metric P 214.

In one embodiment, the computing device 106 comprises a framework 300 which is used to monitor and control a software system and updating the metric. The preventability metric is used to evaluate the quality of software from the perspective of how well the application is resistant to bugs or failures in future i.e. when in use after deployment. As the methodology provides five plausible aspects identified for an application or software which might make the application robust against failures. Hence a framework to evaluate the measures of these aspects periodically and update the metric when changes are introduced is a requisite. The framework provides in carrying out the evaluation in a systematic way whenever there is a need for it.

Figure 3:
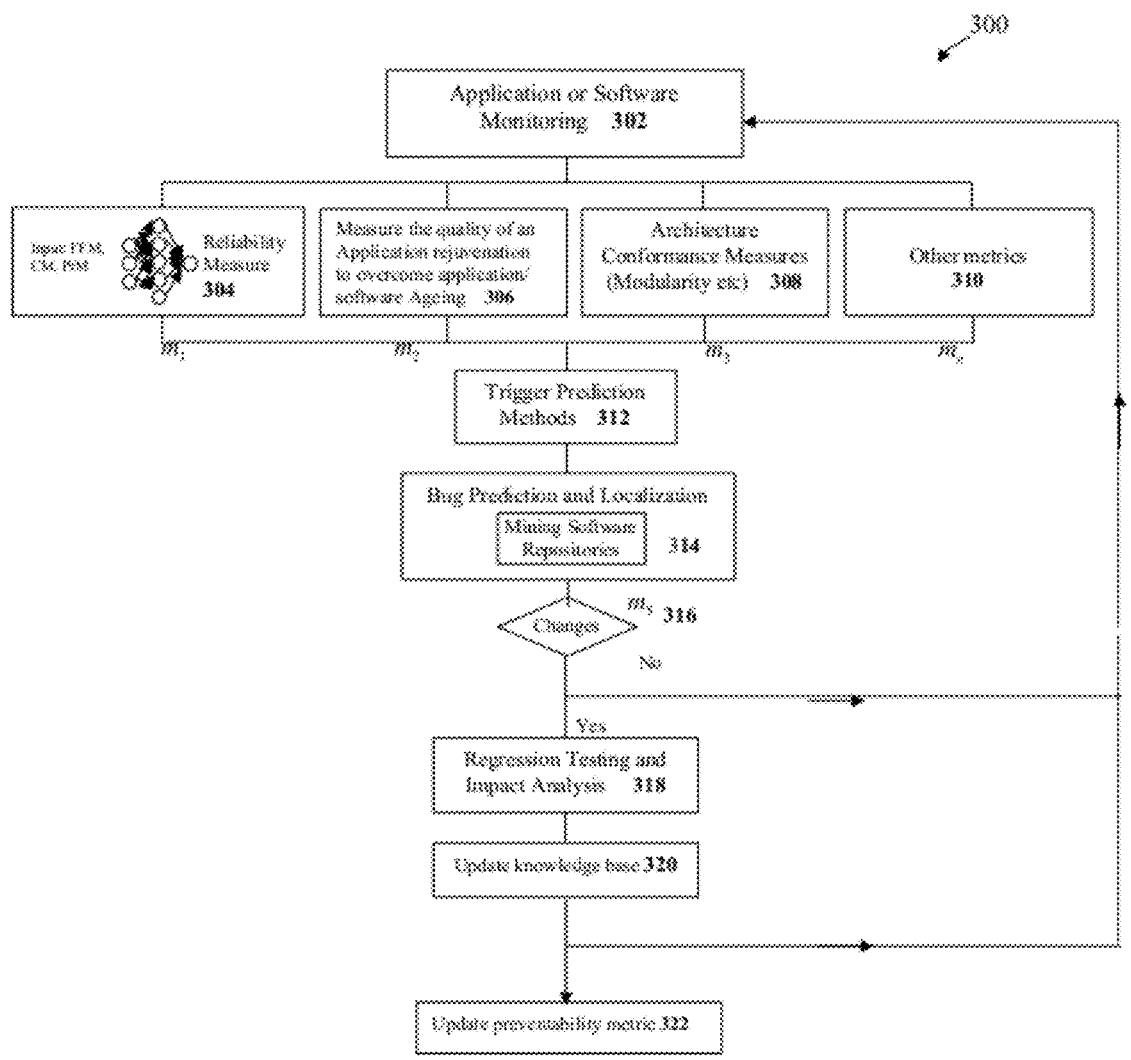
FIG. 3 illustrates an exemplary framework to monitor and control an application system.

In the framework shown in FIG. 3 is to monitor and control application 302, bug prediction and regression testing (312, 314) are carried out only after evaluating the metrics (304, 306, 308, 310) for other aspects of application or software to ensure that bug prediction methods are triggered only when there is a significant change 316 in the metrics related to architecture, aging, modularity etc (304, 306, 308, 310). After bug prediction is carried out and if any changes are incorporated in the application code, regression testing and analysis is performed 318 and knowledge database is updated 320.

Simultaneously, the method also extracts the metrics to quantify the efficiency of bug prediction and regression testing analysis. Finally, combining all the new metrics to arrive at the preventability metric of the application or software. The entire process of updating the metric 322 can be considered as a monitoring 302 activity which helps in the maintenance activity by keeping log of the changes that are happening to the application over a period of time. Since, monitoring is carried out in time shifts, changes introduced at any level should be recorded. In the framework shown in FIG. 3, a loop is indicated after regression testing and knowledge update block to signify that any changes introduced will be updated accordingly.

The advantages of the preventability metric are quantifying the quality of software; showing the precautions taken to prevent the failures that might surface in future; Guiding the development team to look-for or apply techniques that improve the preventability score, the more the score is, more is a possibility that the post maintenance activity is reduced. Therefore, less cost towards maintenance of application; It provides a systematic procedure to evaluate the quality of the application in terms of prevention of failures; It also helps in devising and using techniques to improve the preventability score; Considerable reduction in effort spent on correcting bugs after an application has been deployed; and Preventive Maintenance improves the future maintainability by reducing the effort spent on reactive type of maintenance.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method to measure preventability of failures of an application, the method comprising executing at an application server, the steps of:
   receiving a request for identifying at least one predefined metric corresponding to the application, wherein each identified predefined metric expresses efficiency of a corresponding failure preventive techniques implemented in connection with the application;
   assigning a weighing coefficient to each identified predefined metric;
   generating one or more weighted metric values for the application, wherein generating the one or more weighted metric values comprises measuring a value corresponding to each identified predefined metric and multiplying each measured value with the weighing coefficient assigned thereto;
   combining the one or more weighted metric values to generate a preventability metric expressing effectiveness of failure preventability within the application; and
   transmitting the generated preventability metric to a client.

2. The method as claimed in claim 1, wherein a weighing coefficient assigned to an identified predefined metric is determined based on a contribution of a failure preventive technique corresponding to said identified predefined metric in preventing failures in the application.

3. The method as claimed in claim 1, wherein at least one identified predefined metric expresses efficiency of a failure preventive technique selected from at least one of a bug prediction, regression testing analysis, application rejuvenation, architecture conformance, intelligent management of incidents and other data using knowledge engineering techniques, and any combination thereof.

4. The method as claimed in claim 3, wherein a value corresponding to an identified predefined metric for assessing efficiency of a bug prediction technique, is obtained using version and bug histories of the application.

5. The method as claimed in claim 3, wherein an identified predefined metric for assessing efficiency of a regression testing technique is measured by evaluating reduction of failures using the regression testing technique, wherein the reduction of failures is evaluated by determining a number of bugs in a current version of the application and a number of bugs that occurred in a previous version of the application.

6. The method as claimed in claim 3, wherein an identified predefined metric for assessing efficiency of an application rejuvenation technique is measured by determining a number of failures of the application that are avoided by using anti-ageing techniques.

7. The method as claimed in claim 3, wherein an identified predefined metric for assessing efficiency of an application rejuvenation technique is measured by determining a reduction in failures of the application, and wherein said reduction in failures is determined by measuring a number of failures of the application due to application ageing and a number of failures of the application after using anti-ageing techniques.

8. The method as claimed in claim 3, wherein an identified predefined metric for assessing efficiency of an architecture conformance technique is measured by identifying individual metrics of predetermined parameters of application architecture and combining all the identified individual metrics.

9. The method as claimed in claim 8, wherein the predetermined parameters of application architecture are selected from at least one of modularity, concurrency, GUI conformance and parallelism.

10. The method as claimed in claim 3, wherein an identified predefined metric for assessing efficiency of a knowledge engineering technique is measured by subjecting a maintenance team of a project to subjective tests.

11. The method as claimed in claim 3, wherein an identified predefined metric for assessing efficiency of a knowledge engineering technique provides a reduction in time and effort for maintenance and reduces failures in the application.

12. The method as claimed in claim 1, wherein the preventability metric is controlled and monitored using a framework in the client.

13. The method as claimed in claim 1, wherein the client is a computing device.

14. A system for measuring preventability of failures of an application, the system comprising:
   a. an application server configured to:
      receive a request for identifying at least one predefined metric corresponding to the application, wherein each identified predefined metric expresses efficiency of a corresponding failure preventive technique implemented in connection with the application;
      assign a weighing coefficient to each identified predefined metric;
      generating one or more weighted metric values for the application, wherein generating the one or more weighted metric values comprises measuring a value corresponding to each identified predefined metric and multiplying each measured value with the weighing coefficient assigned thereto; and
      combine the one or more weighted metric values to generate a preventability metric expressing effectiveness of failure preventability within the application;
   b. a computing device comprising:
      a processor configured to receive the preventability metric; and
      a framework to monitor and control the preventability metric; and
   c. a display unit in communication with the computing device configured to display a determined value of failure preventability corresponding to the application.

15. The system as claimed in claim 14, wherein the computing device is in network communication with the application server.

16. The system as claimed in claim 14, wherein the application server includes a weighing coefficient block configured to assign a weighing coefficient to each identified predefined metric based on contribution of the failure preventive technique corresponding to said identified predefined metric in preventing failures in the application.

17. The system as claimed in claim 14, wherein the application server includes a metric identifying block configured to identify one or more predefined metrics.

18. The system as claimed in claim 17, wherein the application server comprises a metric measuring block configured to calculate a value corresponding to each identified predefined metric, wherein said value expresses efficiency of a failure preventive technique corresponding to said identified predefined metric, and wherein at least one failure preventive technique is selected from at least one of a bug prediction, regression testing analysis, application rejuvenation, architecture conformance, knowledge engineering, and any combination thereof.

19. The system as claimed in claim 18, wherein the metric measuring block determines a value corresponding to an identified predefined metric for assessing efficiency of a bug prediction technique using version and bug histories of the application.

20. The system as claimed in claim 18, wherein the metric measuring block measures efficiency of a regression testing technique by evaluating reduction of failures using the regression testing technique, wherein the reduction of failures is evaluated by determining a number of bugs in a current version of the application and a number of bugs that occurred in a previous version of the application.

21. The system as claimed in claim 18, wherein the metric measuring block measures efficiency of an application ageing rejuvenation technique by measuring a reduction in failures of the application, and wherein said reduction in failures is determined by measuring a number of failures of the application due to application ageing and a number of failures of the application after using anti-ageing techniques.

22. The system as claimed in claim 18, wherein the metric measuring block measures efficiency of an architecture conformance technique by identifying individual metrics of predetermined parameters of application architecture and combining all the identified individual metrics.

23. The system as claimed in claim 22, wherein the predetermined parameters of application architecture are selected from at least one of modularity, concurrency, GUI conformance and parallelism.

24. The system as claimed in claim 18, wherein the metric measuring block measures efficiency of a knowledge engineering technique by subjecting a maintenance team of a project to subjective tests.

* * * * *